United States Patent [19]

Allen et al.

[11] 4,407,725

[45] Oct. 4, 1983

[54] REGENERATION OF ACTIVATED CARBON

[75] Inventors: Hanceford L. Allen, Bartow; William W. Berry, Lakeland; Robert W. Leibfried, Tampa, all of Fla.

[73] Assignee: International Minerals & Chemical Corp., Terre Haute, Ind.

[21] Appl. No.: 320,624

[22] Filed: Nov. 12, 1981

Related U.S. Application Data

[63] Continuation of Ser. No. 180,050, Aug. 21, 1980, abandoned, which is a continuation-in-part of Ser. No. 22,082, Mar. 19, 1979, abandoned.

[51] Int. Cl.³ .................... B01J 20/34; B01J 20/20; C01B 25/16
[52] U.S. Cl. ................... 502/25; 423/321 R; 502/27
[58] Field of Search ............ 252/414, 413, 415, 420; 423/321 R

[56] References Cited

U.S. PATENT DOCUMENTS

| | | | |
|---|---|---|---|
| 1,074,337 | 9/1913 | Wijnberg | 252/412 |
| 1,533,031 | 4/1925 | Saver | 252/412 |
| 3,082,059 | 3/1963 | Goren | 252/412 |
| 3,122,415 | 2/1964 | Gilchrist | 23/165 |
| 3,186,793 | 6/1965 | Gillis et al. | 23/165 |
| 3,306,714 | 2/1967 | Goren | 423/321 S |
| 3,510,265 | 5/1970 | Kawahata | 210/32 |
| 3,720,626 | 3/1973 | Benzaria | 252/413 |
| 3,872,215 | 3/1975 | Cherdron et al. | 423/309 |
| 3,927,175 | 12/1975 | Garofano | 252/420 |
| 3,965,036 | 6/1976 | Himmelstein | 252/414 |
| 3,993,733 | 11/1976 | Irani | 423/313 |
| 3,993,736 | 11/1976 | Irani | 423/321 S |
| 4,187,195 | 2/1980 | Kennedy | 252/412 |
| 4,299,805 | 11/1981 | Wells | 423/321 R |

FOREIGN PATENT DOCUMENTS

| | | |
|---|---|---|
| 4807 | 10/1979 | European Pat. Off. ............ 252/413 |
| 2206706 | 8/1973 | Fed. Rep. of Germany . |
| 481511 | 12/1916 | France . |
| 49-20720 | 5/1974 | Japan . |
| 51-51151 | 5/1976 | Japan . |
| 934695 | 8/1963 | United Kingdom . |
| 1103224 | 2/1968 | United Kingdom . |
| 1191245 | 5/1970 | United Kingdom . |
| 1442919 | 7/1976 | United Kingdom . |

OTHER PUBLICATIONS $P_2O_5$–"The Production of Green Phosphoric Acid with Pittsburgh Activated Carbon", Calgon Technical Bulletin (1968).
Michel–"Laboratory Procedure for the Production of Green Wet Process $P_2O_5$", Calgon Technical Paper (1970).
Baker–"Waste Water Treatment: Recovering Para–Cresol from Process Effluent", Chemical Engineering Progress–vol. 69, No. 8, pp. 77–78 (Aug. 1973).
Chemical Abstracts, vol. 87, 1977–p. 267, No. 188820R.
Lovem–"Activated Carbon–Perspectives on Carbon Regeneration", Chemical Engineering Progress, vol. 69, No. 11 (Nov. 1973).
Himmelstein–"Activated Carbon-in-Place Regeneration of Activated Carbon", Chemical Engineering Progress, vol. 69, No. 11 (Nov. 1973).
Rovel–"Chemical Regeneration of Activated Carbon", Symp. on Applications of New Concepts of Physical–Chemical Wastewater Treatment (Sep. 18–22, 1972).
Matsumoto–"Regenerate Granular Carbon", Hydrocarbon Processing–May 1976, pp. 157–160.
Hernandez–"Regeneration of Powdered Active Carbon in Fluidized Bed", Environmental Science & Technology, vol. 10, No. 5, pp. 454–456, May 1976.
Merck Index, 6th Edition, 1952–p. 502.

*Primary Examiner*—P. E. Konopka
*Attorney, Agent, or Firm*—Robert H. Dewey

[57] ABSTRACT

Spent activated carbon previously used to remove humate-type organic impurities from an aqueous inorganic acid solution is regenerated by a specific chemical regeneration process. According to this process, the spent carbon is subjected to the following treatments: (1) a first water wash, (2) a caustic wash in which at least 1.5% free caustic is maintained, (3) a warm and preferably hot water wash, and (4) an optional periodic acid wash. The process is particularly applicable to regenerating activated carbon used to remove humates from wet process phosphoric acid.

4 Claims, No Drawings

REGENERATION OF ACTIVATED CARBON

This is a continuation, of copending application Ser. No. 180,050, filed Aug. 21, 1980, which is a continuation-in-part of application Ser. No. 22,082 filed Mar. 19, 1979, and now both abandoned.

The present invention relates to the regeneration of activated carbon used in the absorption of organic substances from inorganic acidic media. In its preferred form the process of the present invention can be employed to regenerate activated carbon used in the removal of humates from wet process phosphoric acid.

"Wet Process" phosphoric acid is conventionally prepared by acidulating phosphate rock (which contains calcium phosphate) with sulfuric acid to produce phosphoric acid and insoluble calcium sulfate (gypsum). Phosphate rock, such as that mined in Florida and in many countries of the world such as Morocco, contains many impurities including carbonaceous matter, $SiO_2$ and other metallic contaminants. During the acidulation step, some of the carbonaceous material is converted to humic acids and related organic compounds generally referred to as humates. These humates are generally responsible for the black color of crude wet process phosphoric acid. This black phosphoric acid product is normally filtered to remove gypsum, silica and miscellaneous impurities. The so-called filter-grade acid produced at this stage of the conventional process, however, still contains many metallic impurities, traces of unreacted silica, gypsum solids that crystallize after filtration and suspended humates of various particle sizes.

While filter-grade acid containing these impurities is not objectionable for fertilizer manufacture, for other applications, the filtered acid must be further purified. For example, wet process phosphoric acid contains significant amounts of uranium which can be separated for recovery by solvent extraction. The presence of impurities, especially the humates, tned to cause the formation of stable emulsions with the organic solvents used in the uranium extraction process. The build-up of these emulsion products in a countercurrent extraction system can seriously interfere with the extraction of uranium.

To remove humates and other impurities from phosphoric acid the art has suggested the use of activated carbon as an absorbent. See e.g., Gillis, U.S. Pat. No. 3,186,793; Irani, U.S. Pat. No. 3,993,735 and "$P_2O_5$ - The Production of Green Phosphoric Acid with Pittsburgh Activated Carbon", Calgon Technical Bulletin (1968). Many of the prior art processes have involved mixing activated carbon with the acid stream followed by filtering the mixture to remove spent carbon which is then disposed of. Because of the high costs of activated carbon, however, this type of process has not found significant commercial application. While various methods of regenerating carbon for reuse in phosphoric acid clean-up processes have been suggested, none of these methods has proven to be commercially feasible.

In general, there are four basic methods of carbon regeneration described in the prior art: solvent wash, acid or caustic wash, steam reactivation, and thermal regeneration. For a general description of these methods and the associated problems see Himmelstein, U.S. Pat. No. 3,965,036. See also, Goren, U.S. Pat. No. 3,082,059; Garofano, U.S. Pat. No. 3,927,175; Loven, "Perspectives on Carbon Regeneration," *Chemical Engineering Progress,* Vol. 69, No. 11, pp. 56–62 (1973); and Himmelstein, "In Place Regeneration of Activated Carbon," *Chemical Engineering Progress,* Vol. 69, No. 11, pp. 65–69 (1973).

Wijnberg, U.S. Pat. No. 1,074,337 describes a method for regenerating "decolorizing carbon" which has been used for the treatment of organic substances such as glycerine, lactic acids, greases, oils and the like. The Wijnberg process comprises an initial water wash followed by treatment with a "relatively strong," hot or boiling solution of caustic. The carbon is then washed sequentially with more water and an acid.

In the case of activated carbon for use in phosphoric acid clean-up, the primary method of regeneration suggested in the prior art involves thermal treatment in a furnace. See "$P_2O_5$—The Production of Green Phosphoric Acid with Pittsburgh Activated Carbon," supra. The "$P_2O_5$" bulletin also mentions the possibility of unspecified chemical regeneration in place.

The present invention is based on the discovery that activated carbon used to remove humate-type impurities from inorganic acidic solutions can be efficiently regenerated by a specific chemical regeneration process. Accordingly, the present invention provides a process for regenerating spent activated carbon used to remove humate-type impurities from inorganic acidic solutions, which process comprises the steps of:

(1) contacting said spent activated carbon with a first water wash stream to remove acidic solution from said carbons;

(2) contacting the water-washed carbon from step (1) with an aqueous caustic wash stream having a free NaOH concentration of at least about 1.5% by weight to remove absorbed humate-type impurities from said carbon;

(3) contacting the caustic-washed carbon from step (2) with a warm and preferably hot water wash stream to remove substantially all of the remaining caustic and desorbed humate-type impurities; and (4) after a predetermined number of regeneration cycles according to steps (1–3), optionally contacting the water-washed carbon from step (3) of the last of said cycles with an acid wash stream to remove water insoluble inorganic salts.

The first step of the process of the present invention comprises a water wash. The main purpose of this water wash is to remove acidic values which may be contained on the column. The presence of acidic values will result in greatly increased caustic consumption in subsequent processing steps. In addition, acidic solutions of the type processed according to the present invention often contain traces of silicofluorides which also can react with caustic to produce interfering insoluble impurities. It is not necessary to employ pure fresh water in the initial stages of the first water wash step. Thus, it can be economically feasible to use aqueous processing streams which may have small quantities of acids or other impurities (e.g., pond water), if subsequent stages of the first water wash are carried out with fresh water.

The first water wash should be continued for a time sufficient to remove substantially all the free acid from the spent carbon column. Determination of this point can be made by any of the well known methods such as by pH measurement of the wash effluent. Flow rates of wash water and washing times will depend of course on the column design and extent of acid loading. Suitable operating parameters can be easily determined by one skilled in the art. The wash water preferably is used at ambient temperatures but higher or lower temperatures may be employed if conditions so dictate. Typically, an initial pond water stage of the first wash step generally comprises about 0.5 to 1.5 gallons per pound of carbon in the column. The total contact time is from about 15 to 100 minutes. A fresh water stage of this wash using substantially pure water is then utilized to remove entrained pond water. The amounts, rates and contact times are about the same as in the pond water stage.

The next step of the process of the present invention comprises a caustic wash. In order to effect efficient removal of the humate materials from the spent carbon, it is necessary to have free caustic in the wash medium at all times. If the wash solution becomes acidic, the humate materials may be reabsorbed by the carbon. Maintenance of at least about 1.5% free caustic will ensure the desorption driving force and chemical reaction necessary to remove the humates from the activated carbon. In practice, the use of caustic recirculation with a make-up caustic stream is an efficient manner for accomplishing this result. In general, the caustic solution is preferably employed as an aqueous solution containing an initial concentration about 5% to about 10% by weight of NaOH. Most preferred are initial caustic concentrations of about 5% NaOH by weight. As in the case of the first water wash, ambient temperatures are acceptable, and higher or lower temperatures may be employed.

The caustic wash should be continued for a time sufficient to remove substantially all the absorbed humates from the carbon column. In practice, this point can be determined by monitoring the free caustic in the wash effluent. When the free caustic content of this effluent stablizes, the wash can be discontinued. Particular operating parameters will vary with the column design but the selection of optimum value is well within the skill of the artisan. Typically, the humate removal is effectively achieved by recirculating the caustic through the carbon for about 60 to 180 minutes.

The third step in the process of the present invention comprises a warm and preferably hot water wash to remove any remaining caustic and desorbed humates from the column. In general, this objective can be achieved with washing times of from about 45 to 90 minutes or until the wash effluent analyzed is free of these materials. As in the case of the initial water wash, flow rates, and times may vary widely depending on the nature of the material treated and the equipment design. Temperatures of the warm wash water used in this step are preferably above about 140° F. At lower temperatures the rate of removal of desorbed humates drops off markedly. Applicant has now found that improved regeneration operations can be achieved where a hot wash wash i.e., water at a temperature of at least about 160° F. is employed. Hot wash water temperature can range from about 160° F. to boiling and preferably should fall in the range of about 170° F. to about 180° F. As described in more detail hereinafter, the use of this hot water post-caustic wash significantly lengthens the number of regeneration cycles achievable before acid wash treatment is necessary, and in some cases helps to eliminate all together the need for an acid wash.

The above-described process is generally effective in regenerating activated carbon which has been used for the removal of humate-type materials from acidic solutions. After this process has been practiced for a number of regeneration cycles, however, the build-up of water insoluble inorganic salts may begin to have deleterious effects on the absorption process. In the wet process phosphoric acid system, for example, the presence of sodium silicofluorides and gypsum salts may reduce the carbon surface area and effect a general reduction in the ability of the carbon to absorb humates. The process of the present invention optionally includes a periodic acid wash to remove inorganic salts when salt build-up becomes a problem. Nitric acid is the preferred acidic wash since nitric acid is the most compatible with the piping and equipment generally employed in this type of system. Where such considerations will allow, however, other acidic media such as hydrochloric acid could be employed for the acidic wash. An initial nitric acid concentration of about 5% $HNO_3$ by weight is sufficient for this step. Slightly lower or higher concentrations may be used as the amount of inorganic salts is lower or higher respectively, and within the range of 3 to 10%, and preferably at ambient temperatures.

While the use of an acidic wash will effectively remove the inorganic salt build-up, care must be taken to avoid acid damage to the activated carbon. Accordingly, the number of regeneration cycles between periodic acidic washes should be as great as practicable in the system employed. Determination of the point at which nitric acid wash is necessary can be made by simply removing portion of the carbon and analyzing it for inorganic salt build-up or using known tests for determining surface area reductions and changes in carbon absorption isotherm. After the periodic acid wash the carbon should be flushed with water to remove traces of acid.

In some cases it may be possible to eliminate the periodic acid wash all together, depending on the nature of the overall phosphoric acid clean up process and, as described above, the operation of the other steps in the regeneration cycle. A highly efficient phosphoric acid clean up process is described in commonly assigned, allowed U.S. application Ser. No. 22,083 now U.S. Pat. No. 4,256,570 entitled "Purification of Phosphoric Acid" filed Mar. 19, 1979 (hereby incorporated by reference). In this process wet process phosphoric acid is first cooled, then treated with clay, and finally treated with activated carbon. Carbon utilized in this process, can be effectively regenerated more than 50 times using the hot water wash regeneration process of the present invention without the need for an acid wash to remove inorganic build-up. Without the benefits achieved by such a phosphoric acid clean up process, however, periodic acid washes will be required to achieve prolonged carbon life.

In the preferred mode of operation the washes of the process of the present invention are performed with the carbon in place in the absorption column. When the column is designed for upflow operation during absorption, the wash solutions are also preferably passed through the column in an upflow manner.

In a preferred practice, extensive use is made of air scouring to increase the efficiency of the regeneration process. This technique consists of momentarily stopping the fluid flow through the carbon column and bubbling or sparging air into the base of the column. Air scouring serves to expand the bed and thus aids in exposing more of the carbon surface to the wash solutions. The air scouring is preferably employed during the various washing steps described above and may also be utilized just before the column is brought back on line in the phosphoric acid clean up process to minimize the potential for acid channeling.

The following specific examples are intended to illustrate more fully the nature of the present invention without acting as a limitation on its scope.

EXAMPLE 1

Fresh granular activated carbon was used to remove humate-type impurities from wet process phosphoric acid. The activated carbon was used until it became spent as evidenced by the inability of the activated carbon to substantially reduce the color of the wet process phosphoric acid being passed through a column containing the granules of activated carbon.

The column containing the granules of activated carbon was drained to remove the acid and then flushed with a first water wash stream. In this example pond water was used in amount of 1.2 gallons per pound of carbon in the column. The washing was effected over a 120 minute period. A fresh water rinse of 0.4 gallons per pound of carbon over a 45 minute period was used to further wash the activated carbon granules. A solution of NaOH with an initial concentration of about 5.5% by weight was circulated through the column for 2.5 hours. During this time the caustic concentration was maintained at approximately 2% by addition of fresh 50% NaOH as required. This effectively removed absorbed humate-type impurities. Initially, the caustic solution was clear, but darkened as the humate-type impurities were picked-up by the caustic solution. After 2.5 hours, the caustic circulation was stopped and the column drained and then flushed with water at 145° F. for about 2 hours to remove substantially all of the remaining caustic and desorbed humate-type impurities. 1.2 gallons of water per pound of carbon were used in this flush. The flush was continued until the exit water was substantially clear.

The above reactivated carbon was again used to remove humate-type impurities from wet process phosphoric acid. The reactivated carbon performed substantially the same as fresh granules activated carbon. After the reactivated carbon again became spent, it was again regenerated or reactivated by the above procedure. It has been determined that the carbon granules may be regenerated in excess of 15 times and still produce a regenerated activated carbon which has activity and utility in removing humate-type impurities from wet process phosphoric acid.

EXAMPLE 2

In one series of regenerations according to Example 1 the activated carbon granules although still active, were removed from service after only 5 regenerations and after the warm water wash, the granules were immersed in 5% nitric acid solution to remove insoluble inorganic salts. Air was periodically sparged through the column containing the granules and nitric acid to agitate the granules and achieve a more efficient washing effect. The acid was then drained from the column and then the column was flushed with fresh water. Prior to nitric acid regeneration the carbon activity was 92.7% as compared to fresh activated carbon. After the nitric acid regeneration the activity was 94% as compared to fresh activated carbon. The regenerated carbon was again used to treat wet-process phosphoric acid. In another run used activated carbon granules having activity of 75% were restored to 86% activity, as compared to fresh activated carbon. The regenerated carbon was again useful in treating wet-process phosphoric acid.

EXAMPLE 3

The regeneration process of Example 1 was repeated except that the post-caustic water wash was carried out at a temperature of about 170° F. After 50 cycles according to this process the carbon still has the requisite activity and utility in removing humate-type impurities from wet process phosphoric acid.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for performing repeated regeneration cycles of up to more than 50 times on spent activated carbon over the useful life of said carbon after each use of said carbon to remove humate-type impurities from cooled wet process phosphoric acid that has been treated with clay wherein each of said regeneration cycles consists essentially of the following steps:
   (a) contacting said spent activated carbon with a first water wash stream in an amount of 0.5 to 1.5 gal/lb of carbon for a contact time of 15–100 minutes to remove said acidic solution from said carbon;
   (b) contacting the water-washed carbon from step (a) with an aqueous caustic wash stream having a free NaOH concentration of at least about 1.5% by weight for a contact time of 60–180 minutes to remove the absorbed humate-type impurities from said carbon; and
   (c) contacting the caustic-washed carbon from step (b) with a hot water wash stream at a temperature in the range of about 170° F. to 180° F. to boiling for a length of time sufficient to remove substantially all of the remaining caustic and desorbed humate-type impurities.

2. The process of claim 1 wherein said caustic wash stream has an initial NaOH concentration of from about 5% to about 10% by weight.

3. The process of claim 1 wherein said contacting steps are effected in a carbon absorption column.

4. The process of claim 3 wherein said wash streams are passed upwardly through said column.

* * * * *